(12) United States Patent
Huffer

(10) Patent No.: US 9,802,353 B2
(45) Date of Patent: Oct. 31, 2017

(54) METHOD OF MAKING A FLEXIBLE MAGNETIZED SHEET

(71) Applicant: SONOCO DEVELOPMENT, INC., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 256 days.

(21) Appl. No.: 14/670,722

(22) Filed: Mar. 27, 2015

(65) Prior Publication Data

US 2016/0279855 A1 Sep. 29, 2016

(51) Int. Cl.
*B29C 47/88* (2006.01)
*B29C 47/00* (2006.01)
(Continued)

(52) U.S. Cl.
CPC .......... *B29C 47/8805* (2013.01); *B29C 35/10* (2013.01); *B29C 47/04* (2013.01); *B29C 47/92* (2013.01); *B29C 71/04* (2013.01); *B29C 35/0222* (2013.01); *B29C 47/0004* (2013.01); *B29C 47/0021* (2013.01); *B29C 47/025* (2013.01); *B29C 47/14* (2013.01);
(Continued)

(58) Field of Classification Search
CPC . B29C 47/8805; B29C 47/0004; B29C 47/00; B29C 71/04; B29C 47/0221; B29C 35/0222; B29C 47/025; B29C 35/10; B29C 47/04; B29C 47/14; B29C 47/92; B29C 2035/0877; B29C 2947/92704; B29L 2007/00; B29K 2995/0008; B29K 2105/16; H01F 1/04; H01F 1/11; H01F 1/00; H01F 1/06; H01F 13/00; H01F 10/12; H01F 1/117
USPC .................................................... 156/244.17
See application file for complete search history.

(56) References Cited

U.S. PATENT DOCUMENTS 2,921,049 A * 1/1960 Moroson ................ C08G 59/00
203/58
3,051,988 A * 9/1962 Baermann ............. B29C 47/126
210/222
(Continued)

FOREIGN PATENT DOCUMENTS

CN          203509735 U  *  4/2014

*Primary Examiner* — Philip Tucker
*Assistant Examiner* — Vicki Wu
(74) *Attorney, Agent, or Firm* — Miller, Matthias & Hull LLP

(57) ABSTRACT

A method of making a flexible magnetized sheet is provided. The method may comprise the steps of (1) using cold extrusion to produce a highly viscous fluid magnetizable sheet, (2) passing the sheet through a magnetic field to create an uncured magnetized sheet, and (3) curing the sheet with electron beam curing. The fluid mixture may comprise magnetizable particles with a random charge orientation and an acrylic resin. The components of the mixture are cool when passed through an extrusion die. The extruded fluid sheet allows for the sheet to be magnetized and then, instead of curing by cooling, cured by the bombardment of electrons via an electron beam (EB) generator. The method can eliminate the heat of extrusion and can allow for more freedom of orientation because the sheet does not cure until it reaches the electron beam curing station.

15 Claims, 3 Drawing Sheets

(51) Int. Cl.

| | |
|---|---|
| B29C 71/04 | (2006.01) |
| B29C 35/10 | (2006.01) |
| B29C 47/04 | (2006.01) |
| B29C 47/92 | (2006.01) |
| B29L 7/00 | (2006.01) |
| H01F 1/04 | (2006.01) |
| H01F 1/08 | (2006.01) |
| H01F 1/11 | (2006.01) |
| H01F 1/00 | (2006.01) |
| H01F 1/06 | (2006.01) |
| H01F 13/00 | (2006.01) |
| H01F 10/12 | (2006.01) |
| H01F 1/117 | (2006.01) |
| B29C 35/02 | (2006.01) |
| B29C 47/02 | (2006.01) |
| B29C 47/14 | (2006.01) |
| B29C 35/08 | (2006.01) |
| B29K 105/16 | (2006.01) |

(52) U.S. Cl.
CPC ............ *B29C 2035/0877* (2013.01); *B29C 2947/92704* (2013.01); *B29K 2105/16* (2013.01); *B29K 2995/0008* (2013.01); *B29L 2007/00* (2013.01); *H01F 1/00* (2013.01); *H01F 1/04* (2013.01); *H01F 1/06* (2013.01); *H01F 1/083* (2013.01); *H01F 1/11* (2013.01); *H01F 1/117* (2013.01); *H01F 10/12* (2013.01); *H01F 13/00* (2013.01)

(56) References Cited

U.S. PATENT DOCUMENTS

| | | | | |
|---|---|---|---|---|
| 4,994,505 | A * | 2/1991 | Gerber | C08G 8/24 523/145 |
| 5,002,677 | A * | 3/1991 | Srail | C08K 3/22 252/62.54 |
| 5,071,578 | A * | 12/1991 | Ohkubo | C08G 18/0828 252/62.54 |
| 5,604,005 | A * | 2/1997 | Endo | G11B 7/2542 428/336 |
| 5,888,417 | A * | 3/1999 | Akioka | H01F 1/0533 148/301 |
| 7,501,921 | B2 * | 3/2009 | Richards | H01F 7/0215 148/103 |
| 2003/0077465 | A1 * | 4/2003 | Boudouris | B32B 27/18 428/469 |
| 2004/0093877 | A1 * | 5/2004 | Wada | F25B 21/00 62/114 |
| 2009/0156761 | A1 * | 6/2009 | Razavi | B01J 21/12 526/130 |
| 2009/0297665 | A1 * | 12/2009 | Bromley | A61K 9/1075 426/72 |

* cited by examiner

Cold extrusion of a mixture comprising magnetic particles and a polymeric binder — 100

Magnetically orienting the magnetic particles to create a fluid magnetized sheet — 102

Curing the fluid magnetized sheet to create a cured magnetic sheet — 104

FIG.2

METHOD OF MAKING A FLEXIBLE MAGNETIZED SHEET

BACKGROUND OF THE INVENTION

Field of the Invention

This disclosure relates to a method of making a flexible magnetized sheet. More particularly, this disclosure relates to a method of making a flexible magnetized sheet using cold extrusion and electron beam curing.

Description of the Related Art

Flexible magnetic sheets are known in the art. A typical method of making a flexible magnetic sheet involves extruding a molten mixture of magnetizable particles (such as iron oxide) suspended in a polymeric binder at an elevated temperature at least as high as the melting point of the polymer, passing the hot melt through a magnetic field to magnetically orient the iron oxide particles, and then cooling the sheet to solidify the binder and "freeze" the particles so that they are unable to shift from their magnetic orientation.

The extrusion step may be done using a slot die and may include co-extruding the magnetizable sheet onto a substrate such as paper. The magnetizing step may be accomplished by running the molten sheet over a magnetic roller. The cooling step may be accomplished by passing the still molten sheet over a cooling roller. The use of ultraviolet (UV) radiation has been tried as a means of solidifying the polymeric binder but has failed due to the opacity of the sheet.

The extrusion die is kept at an elevated temperature which has several disadvantages. Heating the die requires energy. Heating the die results in a molten mixture that begins to cure as it cools, limiting the ability to orient the suspended magnetic particles. And heating the die can decrease the die's useful life.

The present disclosure addresses these disadvantages.

BRIEF SUMMARY OF THE INVENTION

The present invention is a method of making a flexible magnetized sheet comprising the steps of (1) using cold extrusion to produce a highly viscous fluid magnetizable sheet, (2) passing the sheet through a magnetic field to create an uncured magnetized sheet, and (3) curing the sheet with electron beam curing. The fluid mixture may comprise magnetizable particles with a random charge orientation and a polymeric binder (such as an acrylic resin). The components of the mixture are cool when passed through a slot die during the extrusion step. The fluid sheet allows for the sheet to be magnetized and then, instead of curing by cooling, cured by the bombardment of electrons via an electron beam (EB) generator. The method can eliminate the heat of extrusion and can allow for more freedom of orientation because the sheet does not cure until it reaches the electron beam curing station.

In another aspect of the disclosure a method of making a flexible magnetic sheet is provided. The method comprises the steps of (1) extruding through a slot die at room temperature or lower a highly viscous fluid mixture comprising magnetizable particles with a random charge orientation and a polymeric binder to create a fluid magnetizable coating, (2) applying the magnetizable coating to a substrate to create a magnetizable sheet, (3) magnetically orienting the magnetizable particles by passing the magnetizable sheet through a magnetic field to create an uncured magnetized sheet, and (4) curing the uncured magnetized sheet by exposing the uncured magnetized sheet to an electron beam to create a flexible magnetized sheet. The coating may be printed on or pattern applied to the substrate.

BRIEF DESCRIPTION OF THE DRAWINGS

FIG. 2 is a flow diagram of a method according to the disclosure.

DETAILED DESCRIPTION OF THE INVENTION

Figure 1:
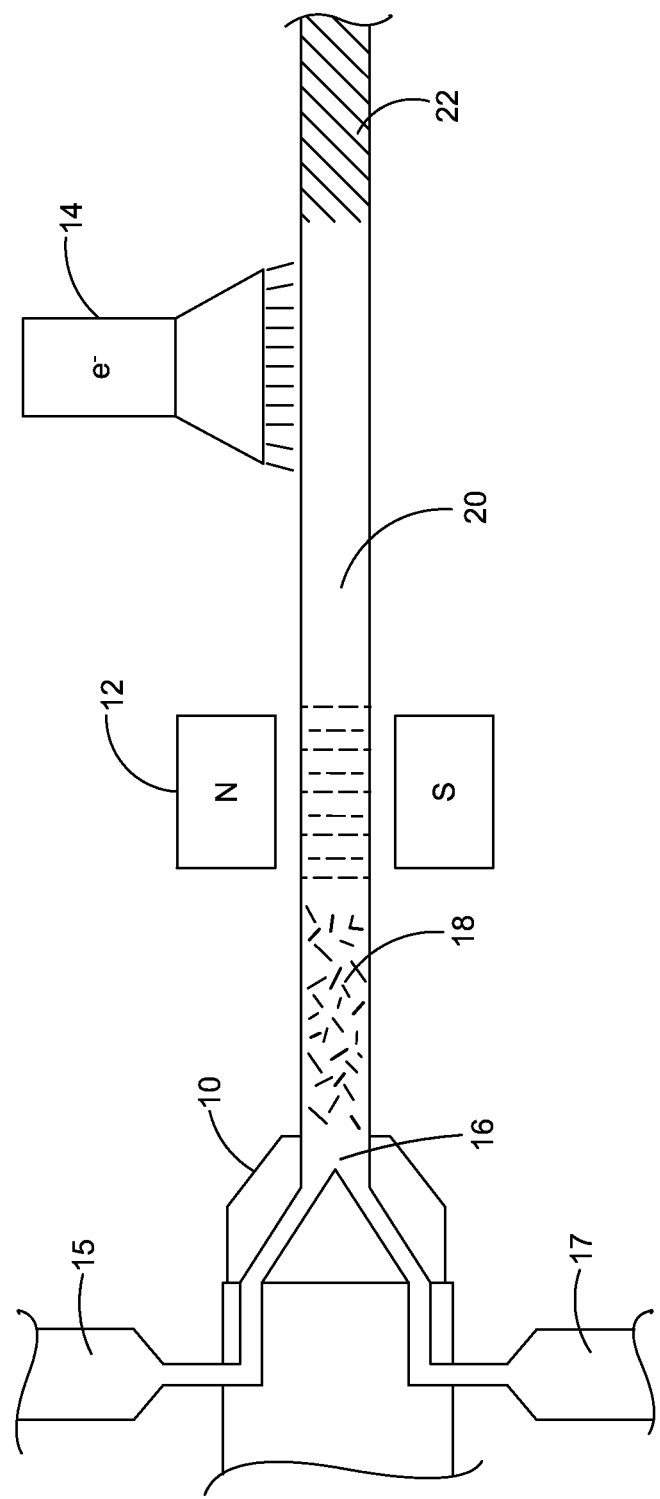
FIG. 1 is a schematic diagram of the equipment used to make a flexible magnetized sheet according to the disclosure.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

This disclosure relates to a novel method of making a flexible magnetized sheet from a highly viscous mixture using a combination of cold extrusion and electron beam curing. The cold extrusion step occurs at an extrusion temperature lower than that used in conventional extrusion and may include using an acrylic binder that is liquid at room temperature. After the extruded sheet is magnetized, electron beam curing is used to solidify the magnetized sheet.

FIG. 1 is a schematic diagram of the equipment used to make a flexible magnetized sheet 22 according to the disclosure. The equipment may include a slot die 10, a magnetizing station 12 and a curing station 14.

The slot die 10 may be any suitable type of extrusion slot die. A typical slot die comprises opposing die parts defining a gap therebetween and actuators for adjusting the gap dimensions. The slot die 10 should be capable of cold extrusion, that is, extrusion at room temperatures or below. In one aspect, a mixture 16 of magnetizable particles 15 suspended in a polymeric binder 17 is passed through the slot die 10 to create a magnetizable sheet 18.

The magnetizing station 12 may be any suitable type of magnetizing station. One type of magnetizing station is described in Richards et al. U.S. Pat. No. 7,501,921, incorporated herein by reference. Richards et al. describes a magnetic roller having a magnetized outer surface. After metal particles are applied to a substrate the substrate passes over the magnetized roller which magnetizes the substrate. Alternatively, the magnetizing station 12 can be any device that imposes a magnetic field strong enough to orient the metallic particles in the magnetizable sheet 18 to create a fluid uncured magnetized sheet 20. The magnetic field may be created by a magnetizing station that does not come into physical contact with the magnetizable sheet 18.

The curing station 14 may employ an electron beam to cure the uncured magnetized sheet 20. For example and without limitation, the curing station may comprise an electron beam generator and shielding. The uncured magnetized sheet 20 is passed through the electron beam to create the final product, a flexible magnetized sheet 22.

FIG. 2 is a flow diagram of a method according to the disclosure. The method may comprise the following steps:

Step 100: Extruding through the slot die 10 at room temperature or lower a highly viscous fluid mixture 16 comprising magnetizable particles 15 with a random charge orientation and a polymeric binder 17 (such as an acrylic resin) to create a fluid magnetizable sheet 18. The viscosity of the polymeric binder 17 should be high enough (such as from about 3,000 to about 4,000 centipoise) to maintain the magnetizable particles 15, such as iron oxide, in suspension. The components of the mixture 16 may be cool (room temperature or lower) when passed through the slot die 10. The polymeric binder 17 should have a melting temperature at or lower than room temperature, that is, at or lower than 72 degrees F., at normal atmospheric pressure.

Step 102: Magnetically orienting the magnetizable particles 15 by passing the magnetizable sheet 18 through a magnetic field to create an uncured magnetized sheet 20.

Step 104: Curing the uncured magnetized sheet 20 by transferring it to a curing station 14 and exposing the uncured magnetized sheet 20 to an electron beam to create a flexible magnetized sheet 22. The curing step 104 converts the fluid acrylic polymer into a solid by breaking double bonds in the acrylic resin and creating cross-linked chemical bonds between strands of adjacent acrylic polymer.

Figure 3:
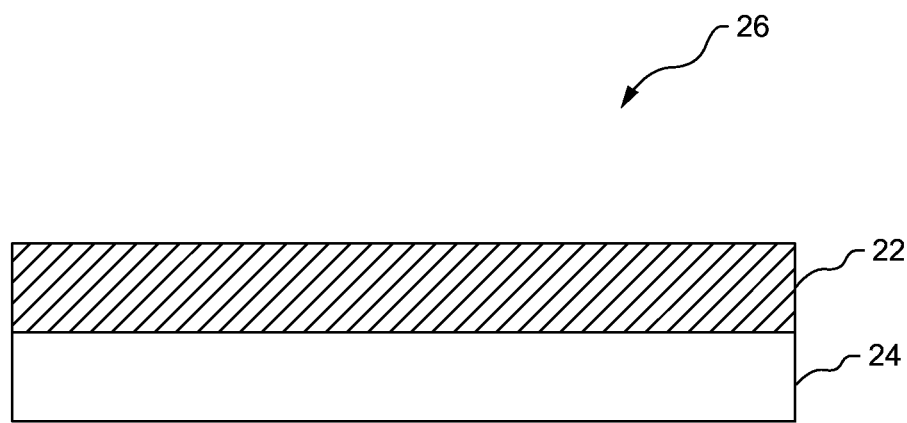
FIG. 3 is a cross-sectional view of a flexible magnetized sheet made according to the disclosure.

The flexible magnetic sheet 22 may be adhered to a substrate 24 after the curing step 104 to produce a dual layer magnetic sheet 26 as shown in FIG. 3. Glue or other adhesive (not shown) may be used to adhere the flexible magnetized sheet 22 to the substrate 24. A pressure sensitive adhesive may be applied to the surface of the substrate 24 opposite the flexible magnetic sheet 22.

Alternatively, the magnetizable sheet 18 may be created by co-extruding the mixture 16 with a substrate 24 during the extrusion step 100. That is, the magnetizable sheet 18 can be coextruded with a substrate 24. This method could also produce the dual layer magnetic sheet 26 shown in FIG. 3.

In another alternative, a magnetized coating created according to the method described herein may be printed on or pattern applied to a substrate before the curing step 104.

Thus there has been described a method of producing a flexible magnetized sheet 22. The components that make up the flexible magnetized sheet 22 are cool when extruded through the slot die 10. The highly viscous yet fluid nature of the extruded magnetizable sheet 18 allows for the sheet 18 to be magnetized and then, instead of cured by cooling, cured by the bombardment of electrons via an electron beam (EB) generator. An acrylic polymer is the preferred binder, so that the uncured magnetized sheet 20 exhibits typical acrylate chemistry, where the double bonds are broken with free radical curing. The disclosed method eliminates the heat required for extrusion and allows for more freedom of orientation because the uncured magnetized sheet 20 does not cure until it passes through the electron beam curing station 14. The finished product, a flexible magnetized sheet 22, may be adhered to a substrate 24 to produce the dual layer magnetic sheet 26 shown in FIG. 3.

INDUSTRIAL APPLICABILITY

The flexible magnetized sheet 22 may be used in a number of applications. For example, a magnetic strip attached to a flexible packaging opening can serve as an enclosable feature to keep product fresh and in containment. Also, for promotion purposes a magnetic strip could be applied the back of an image that could be removed and placed on a refrigerator.

It should be understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A method of making a flexible magnetic sheet comprising the steps of:
   Step 100: Extruding through a slot die at room temperature or lower a fluid mixture comprising magnetizable particles with a random charge orientation and a polymeric binder to create a fluid magnetizable sheet;
   Step 102: Magnetically orienting the magnetizable particles by passing the fluid magnetizable sheet through a magnetic field to create a fluid uncured magnetized sheet; and
   Step 104: Curing the fluid uncured magnetized sheet by exposing it to an electron beam to create a flexible magnetic sheet.

2. The method of claim 1 wherein the polymeric binder is an acrylic resin.

3. The method of claim 1 wherein the polymeric binder has a melting temperature at or lower than room temperature at normal atmospheric pressure.

4. The method of claim 1 wherein the viscosity of the polymeric binder is high enough to maintain the magnetizable particles in suspension.

5. The method of claim 1 wherein the viscosity of the polymeric binder is about 3,000 to about 4,000 centipoise.

6. The method of claim 1 wherein the magnetizable particles comprise iron oxide.

7. The method of claim 1 wherein in Step 102 the magnetic field is created by a magnetic roller having a magnetized outer surface.

8. The method of claim 1 wherein in Step 102 the magnetic field is created by a magnetizing station that does not come into physical contact with the magnetizable sheet.

9. The method of claim 1 wherein in Step 104 the uncured magnetized sheet is passed through a curing station comprising an electron beam generator and shielding.

10. The method of claim 1 comprising the further step of:
    Step 106: Adhering the flexible magnetic sheet to a substrate to produce a dual layer magnetic sheet.

11. The method of claim 1 wherein, prior to Step 102, the magnetizable sheet is adhered to a substrate.

12. The method of claim 1 wherein, prior to Step 102, the magnetizable sheet is coextruded with a substrate.

13. A method of making a flexible magnetic sheet comprising the steps of:
    Step 100: Extruding through a slot die at room temperature or lower a fluid mixture comprising magnetizable particles with a random charge orientation and a polymeric binder to create a fluid magnetizable coating;
    Step 101: Applying the magnetizable coating to a substrate to create a magnetizable sheet;
    Step 102: Magnetically orienting the magnetizable particles by passing the magnetizable sheet through a magnetic field to create an uncured magnetized sheet; and
    Step 104: Curing the uncured magnetized sheet by exposing the uncured magnetized sheet to an electron beam to create a flexible magnetic sheet.

14. The method of claim 13 wherein, during step 101, the coating is printed on the substrate.

15. The method of claim 13 wherein, during step 101, the coating is pattern applied to the substrate.

\* \* \* \* \*